(No Model.)

G. W. GOODWYN.
COFFEE OR TEA POT.

No. 491,478. Patented Feb. 7, 1893.

Witnesses
John Shaw
Robert Bennett

Inventor
George W. Goodwyn.
By James L. Norris.
Attorney

UNITED STATES PATENT OFFICE.

GEORGE WAVERLY GOODWYN, OF PETERSBURG, VIRGINIA, ASSIGNOR OF ONE-THIRD TO BERNARD MANN, OF SAME PLACE.

COFFEE OR TEA POT.

SPECIFICATION forming part of Letters Patent No. 491,478, dated February 7, 1893.

Application filed July 28, 1892. Serial No. 441,510. (No model.)

*To all whom it may concern:*

Be it known that I, GEORGE WAVERLY GOODWYN, a citizen of the United States, residing at Petersburg, in the county of Dinwiddie and State of Virginia, have invented new and useful Improvements in Coffee or Tea Pots, of which the following is a specification.

This invention has for its object to provide a coffee or tea pot with a new and improved strainer for preserving the ground coffee or tea leaves separate from the infusion and to enable the strainer to be raised and lowered in the infusion and to be suspended by a positive connection with the upper edge or rim of a removable vessel located within the coffee or tea pot and having a perforated bottom, the construction being such that the liquid can be caused to pass several times through the ground coffee or tea leaves by simply pouring the liquid through the strainer while the latter is firmly held suspended and then moving the strainer downward and upward through the infusion.

The invention consists essentially in the combination with an ordinary coffee or tea pot having a movable tight cover, of a removable vessel located in the pot, provided with a perforated bottom and having its top edge or rim terminating below the upper edge of the pot, and a perforated coffee or tea strainer having a detachable hooked engagement with the top edge or rim of the removable vessel to positively suspend the strainer or receptacle therein in such manner that the hook can be disengaged from the vessel to permit the strainer to be moved downward and upward therein.

The invention is illustrated by the accompanying drawings, in which—

Figure 1:
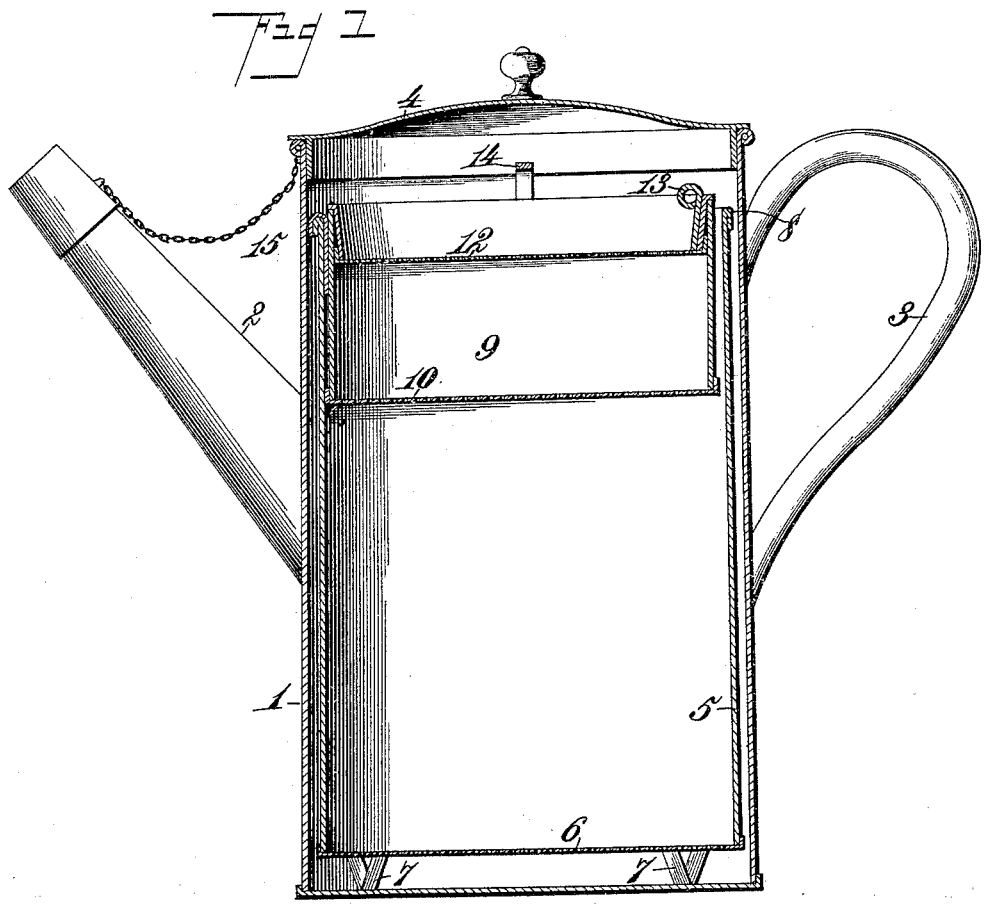
Figure 2:
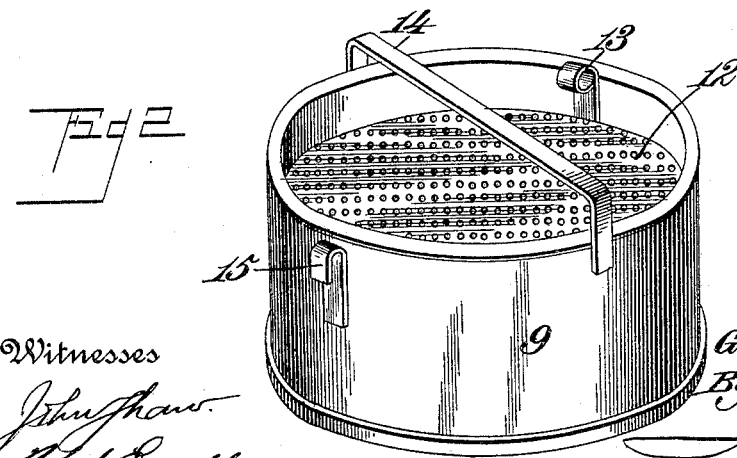

Figure 1, is a vertical sectional view of a coffee or tea pot provided with my invention; and Fig. 2, is a detail perspective view of the improved strainer for containing the ground coffee or tea leaves.

In order to enable those skilled in the art to make and use my invention I will now describe the same in detail, referring to the drawings wherein The numeral 1 indicates a coffee or tea pot of any ordinary construction, but preferably composed of a cylindrical vessel having a spout 2, a handle 3 and a removable tightly fitting cover 4. A separate and independent cylindrical vessel 5 is located within the coffee or tea pot and is provided with a perforated bottom wall 6 from which depends suitable feet or legs 7 adapted to rest upon the bottom wall of the coffee or tea pot so that the perforated bottom is lifted therefrom. The top edge or rim 8 of the removable vessel 5 terminates at some distance below the upper edge of the pot and below the tightly fitting cover 4, and within this vessel is arranged a strainer 9, composed of a ring or band of metal having a perforated bottom wall 10, and a removable perforated cover 12, provided at one end with a finger-piece or handle 13, by which to remove and replace the same. The ring or band 9 is constructed with a suitable handle 14, and the top edge of this ring or band is provided with a hook 15, adapted to engage over the top edge or rim 8 of the removable vessel 5 in such manner that the strainer can be positively suspended in the upper end of the vessel and thus be held against the possibility of downward movement unless the hook is intentionally disengaged from the top edge or rim of the vessel.

The construction and depth of the strainer is such that it bodily lies at a suitable distance below the tightly fitting cover 4, so that the latter can be properly applied to the coffee or tea pot for retaining the aroma.

The ground coffee or tea leaves can be introduced into the cylindrical strainer by removing the perforated cover 12 thereof, after which this cover is applied in position and the strainer is introduced into the removable vessel 5 so that the hook 15 engages the top edge or rim 8 thereof for the purpose of securely suspending the strainer while the liquid is poured into such strainer and passes through the same into the vessel 5 and thence through the perforated bottom wall 6 thereof into the coffee or tea pot. After the liquid has been poured in as explained, the coffee or tea pot is placed on a stove or heater and allowed to remain until the ground coffee or tea leaves become steamed and after condensing and dripping, and with the steam distilling, the strainer containing the ground coffee or tea leaves is lifted through the medium of its handle 14, to disengage the hook 15 from the top edge or rim 8 of the vessel 5, for the purpose of moving the strainer downward and upward in the liquid, whereby the liquid is forced to twice pass through the ground coffee or tea leaves before it reaches the cup in which it is to be used.

The construction described and shown provides a perfect steam coffee or tea pot which preserves all the aroma of the coffee or tea and the full strength of the latter is secured by condensing and distillation, after which the ground coffee or tea leaves can be lowered and raised in the liquid to secure the best results.

The detachable hooked connection between the strainer and the top edge or rim of the removable vessel is a very desirable feature of my construction which renders it advantageous over prior constructions wherein the strainer is provided with springs which are designed to retain the strainer in its adjusted position by frictional contact with the internal surface of a vessel located within a coffee or tea pot.

The detachable hooked connection between the strainer and the top edge or rim of the removable vessel renders it possible to firmly and positively support the strainer in the upper end of such vessel while the liquid is poured thereinto, which feature renders the device superior to the prior construction alluded to.

Having thus described my invention what I claim is:

1. The combination with an ordinary coffee or tea pot having a movable tight cover, of a removable vessel located in the pot, provided with a perforated bottom and having its top edge or rim located below the upper edge of the pot and the cover thereof, and a perforated tea or coffee strainer having a detachable hooked engagement with the top edge or rim of the removable vessel to positively suspend the strainer therein so that by disconnecting the strainer it can be moved downward and upward in the vessel, substantially as described.

2. The combination with an ordinary tea or coffee pot, of a removable vessel located in the pot, provided with a perforated bottom and pendent feet or legs and having its top edge or rim terminating below the upper edge of the pot, and a strainer consisting of a ring or band having a perforated bottom wall, a removable perforated cover, a handle, and a rigid hook extending laterally from the top edge of the ring or band to engage over the top edge or rim of the removable vessel, substantially as described.

In testimony whereof I have hereunto set my hand and affixed my seal in presence of two subscribing witnesses.

GEORGE WAVERLY GOODWYN. [L. S.]

Witnesses:
D. M. BERNARD,
WM. P. McRAE.